US011200554B2

(12) United States Patent
Karantzis (10) Patent No.: US 11,200,554 B2
(45) Date of Patent: Dec. 14, 2021

(54) SECURING A TRANSACTION (71) Applicant: iSignthis Ltd

(72) Inventor: Nickolas John Karantzis, East Melbourne (AU)

(73) Assignee: ISX IP LTD, Tortola (VG)

( * ) Notice: Subject to any disclaimer, the term of this patent is extended or adjusted under 35 U.S.C. 154(b) by 231 days.

(21) Appl. No.: 15/538,958

(22) PCT Filed: Dec. 22, 2015

(86) PCT No.: PCT/AU2015/050827
§ 371 (c)(1),
(2) Date: Jun. 22, 2017

(87) PCT Pub. No.: WO2016/101027
PCT Pub. Date: Jun. 30, 2016

(65) Prior Publication Data
US 2017/0364894 A1 Dec. 21, 2017

(30) Foreign Application Priority Data
Dec. 24, 2014 (AU) .................. 2014905270

(51) Int. Cl.
*G06Q 20/20* (2012.01)
*G06Q 20/08* (2012.01)
(Continued)

(52) U.S. Cl.
CPC ......... *G06Q 20/206* (2013.01); *G06Q 20/085* (2013.01); *G06Q 20/102* (2013.01);
(Continued)

(58) Field of Classification Search
None
See application file for complete search history.

(56) References Cited

U.S. PATENT DOCUMENTS 7,930,554 B2 * 4/2011 Coulier ............... G06F 21/33
713/184
8,768,778 B2 * 7/2014 Smith .................. G06Q 20/10
705/26.1
(Continued)

FOREIGN PATENT DOCUMENTS

| GB | 2481587 A | * | 1/2012 | .......... G06Q 20/385 |
| WO | 2009/001020 A1 | | 12/2008 | |
| WO | 2014/006618 A1 | | 1/2014 | |

OTHER PUBLICATIONS

Kim et al. "A Study on One-Time Password Authentication Scheme in Smart Work" (International Information Institute (Tokyo). Information; Apr. 2014; 17, 4) (Year: 2014).*
(Continued)

*Primary Examiner* — Neha Patel
*Assistant Examiner* — Clay C Lee
(74) *Attorney, Agent, or Firm* — Kilpatrick Townsend & Stockton LLP (57) ABSTRACT

There is provided a computer-implemented method for securing a transaction. The method comprises receiving or determining 193 a plurality of sub-charges associated with the transaction; and determining 195 a password to secure completion of the transaction based on the plurality of the sub-charges.

19 Claims, 7 Drawing Sheets

(51) Int. Cl.
  *G06Q 20/10* (2012.01)
  *G06Q 20/22* (2012.01)
  *G06Q 20/40* (2012.01)
  *G06Q 30/00* (2012.01)

(52) U.S. Cl.
  CPC ......... *G06Q 20/204* (2013.01); *G06Q 20/227* (2013.01); *G06Q 20/40* (2013.01); *G06Q 20/401* (2013.01); *G06Q 30/00* (2013.01)

(56) References Cited

U.S. PATENT DOCUMENTS

| | | | | |
|---|---|---|---|---|
| 2003/0028484 A1* | 2/2003 | Boylan | ............... | G06Q 20/04 705/40 |
| 2003/0061171 A1 | 3/2003 | Gilbert et al. | | |
| 2011/0276495 A1* | 11/2011 | Varadarajan | ......... | G06Q 20/382 705/71 |
| 2012/0078791 A1* | 3/2012 | Huang | ................ | G06Q 20/02 705/44 |
| 2012/0264405 A1 | 10/2012 | Bravo et al. | | |
| 2012/0323791 A1* | 12/2012 | Karantzis | ............... | G06Q 20/40 705/44 |
| 2013/0185209 A1 | 7/2013 | Ahn | | |
| 2014/0081784 A1* | 3/2014 | Ahn | ................ | G06Q 20/322 705/21 |
| 2014/0122265 A1 | 5/2014 | Mardikar et al. | | |
| 2014/0357187 A1* | 12/2014 | Ehrensvard | ........... | H04L 63/123 455/41.1 |

OTHER PUBLICATIONS

Girard, P. et al: "A new Payment Protocol over the Internet", 2010 Fifth International Conference on Risks and Security of Internet and Systems (CRiSIS), IEEE, Oct. 10-13, 2010, Montreal, QC, pp. 1-6.
International Search Report and the Written Opinion of the International Searching Authority corresponding to PCT/AU2015/050827, dated Apr. 18, 2016, 5 pages.
Written Opinion of the International Searching Authority corresponding to PCT/AU2015/050827, dated Apr. 18, 2016, 4 pages.
EP Patent Application No. 15871350.3 filed Dec. 22, 2015, Extended European Search Report dated May 24, 2018, all pages.

\* cited by examiner

SECURING A TRANSACTION

CROSS-REFERENCE TO RELATED APPLICATIONS

The present application claims priority from the Australian provisional application 2014905270 filed on 24 Dec. 2014 with iSignthis Ltd being the applicant and the contents of which are incorporated herein by reference.

TECHNICAL FIELD

The present disclosure generally relates to securing transactions. Aspects of the disclosure include computer-implemented methods, software and computer systems.

BACKGROUND

Widespread availability and use of computer systems and the Internet have resulted in electronic financial transactions becoming commonplace. The use of financial instruments such as credit cards, debit cards, virtual cards and bank accounts to purchase goods or services from online merchants or vendors is convenient. Merchants are now offering services that allow for collection or access of the purchased goods or services to be at a time of the customer's convenience, often via a third party's collection service. That is, the goods or services that are not immediately accessed, vended or downloaded upon payment may be sent to an intermediate access facility for subsequent collection by the customer.

These intermediate access facilities, such as those now being offered by postal and courier services are often 24 hour and intended to be self-service, allowing great flexibility to customers to retrieve their goods or services at any time. Similarly, retailers are offering services whereby goods are ordered online and collected from a local store either by an automated, access controlled retrieval system or with assistance from store staff. It is preferable that access is automated, with purchasers receiving a password via electronic means in order to access the facilities. Current technologies provide a range of security tools to access lockers, for example, smart cards, personal codes.

Additionally or alternatively, a unique code may be generated according to certain security algorithms and communicated to consumers when a parcel or package is ready for pick-up, the issue of payment fraud is not mitigated by these access control means.

Download, subscription, pay per access or vended products are also commonly accessed by means of an access code or one-time-password (OTP) provided to the customer at a time subsequent to making successful payment.

Merchants have in the past relied upon insecure means of transmitting these access codes or OTPs, including by use of mail, SMS, MMS, email or other electronic communications. These methods can often be intercepted, making them susceptible to unauthorised use due to the technical nature of these communication means.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

In a first aspect there is provided a computer-implemented method for securing a transaction, said method comprising:
receiving or determining a plurality of sub-charges associated with the transaction; and
determining a password to secure completion of the transaction based on the plurality of the sub-charges.

The present disclosure provides a secure way to determine a password to secure a transaction and facilitate delivery of goods or services purchased by a purchaser through the transaction. Securing online transactions needs technical knowledge and skills in relation to transaction protocols, password generation, etc. Resulting from these technical knowledge and skills, it is an advantage of the present disclosure that the password is determined based on a plurality of sub-charges associated with the transaction such that the transaction is secured. Further, the password is determined for each transaction, which means each transaction has its own unique password that is not likely to be the same as the password for another transaction. Such a password determination mechanism does not only enhance the security of the transaction, but also makes it unnecessary for a user to remember a password or change the password manually.

The plurality of the sub-charges may be retrievable from an existing secure facility such as the purchaser's banking portal, which provides secure, remote, mobile, online or telephone (voice) access to electronic transactions and account statements. At the same time, it is an advantage that the method can be used with existing payment networks, standards and protocols, allowing for time and cost efficiency by not requiring customisation of existing standards. A further advantage is that the means that are used to secure access to the customer's banking portals (e.g., security tokens) are reused as part of this process. Similarly, phone banking, core banking, online banking and credit card authorisation networks are used in the process without modification. The process is enhanced as the core banking facilities associated with any financial institution are upgraded from memo or batch post to real time posting of transactions.

The plurality of sub-charges may be associated with a particular financial instrument comprising one of a group of financial instruments consisting of a credit card, a debit card, a charge card, a store card, a direct debit facility and a bank account.

Determining the password based on the plurality of sub-charges may comprise sequencing the plurality of sub-charges in an order indicated by an assembly key to determine the password.

Wherein, the step of sequencing may be linear sequence coding. The assembly key indicating the order in which the plurality of sub-charges are arranged may be transmitted to an electronic address previously nominated by the purchaser, which can be used by the purchaser to regenerate the password.

The password is a one-time-password (OTP).

Determining the password may be based on the plurality of sub-charges further comprises performing a mathematical transformation on the sequenced plurality of sub-charges to determine the password.

Determining the password may be based on the plurality of sub-charges comprises performing a mathematical transformation on the plurality of sub-charges to determine the password.

The mathematical transformation may be non-linear and convoluted coding and may be transmitted to a separate password computing device.

The sum of the plurality of sub-charges may be substantially equal to charge amount of the transaction.

The method may further comprise making a plurality of sub-payments corresponding to the plurality of sub-charges.

The method may further comprise:
receiving a further plurality of sub-charges; and
making a plurality of sub-payments corresponding to the plurality of sub-charges if the further plurality of sub-charges are the same as the plurality of sub-charges.

The method may further comprise sending the password to an access facility.

The access facility may be an access control device that can be used by the purchaser to retrieve the products or services purchased through the transaction if the password held by the access facility matches a password provided by the purchaser. The password provided by the purchaser may be determined by the assembly key retrieved from the electronic address and/or the mathematical transformation performed by the separate password computing device, based on the plurality of sub-charges that the purchaser retrieves from the secure facility such as the purchaser's bank.

The method may further comprise:
receiving a further password; and
authenticating the completion of the transaction if the further password matches the determined password.

In a second aspect, there is provided a computer-implemented method for securing a transaction, said method comprising:
storing a password determined based on a plurality of sub-charges associated with the transaction;
receiving a further password; and
authenticating the completion of the transaction if the further password matches the stored password.

Completion of the transaction may comprise allowing access to the goods or services purchased by the transaction.

In a third aspect there is provided a computer software program, including machine-readable instructions, when executed by a processor, causes the processor to perform any of the methods described above.

In a fourth aspect there is provided a computer system for securing a transaction, the computer system comprising a processor that comprises:
a sub-charge determination unit to receive or determine a plurality of sub-charges associated with the transaction; and
a password determination unit to determine a password to secure completion of the transaction based on the plurality of the sub-charges.

The computer system may further comprise a communication port in communication with the processor, where in the processor may be further adapted to send the password to an access facility via the communication port.

In a fifth aspect there is provided a computer system for securing a transaction, the computer system comprising:
a datastore to store a password determined based on a plurality of sub-charges associated with the transaction;
a communication port to receive a further password; and
a processor to authenticate the completion of the transaction if the further password matches the stored password.

In a sixth aspect there is provided an access facility for use in a secure transaction, wherein the access facility receives a password determined in accordance with the method described above where appropriate.

Optional features of the first aspect are also optional features of the second to sixth aspect where appropriate.

It is an advantage of at least one example of the disclosure to ameliorate merchant's fraud risk by linking the financial instrument used in the purchase to the act of accessing the goods or services stored in the access facility by the customer by using means which include a challenge and response method that incorporates an OTP. The method requires that the OTP can only be retrieved by the legitimate owner or user of the financial instrument, and that data contained within the transactions associated with the purchase are transformed into an OTP. In this way, the merchant's fraud risk is ameliorated, as only the bona fide user of the financial instrument will have access to the data contained within the financial transactions associated with the purchase in order to transform such into an OTP. The OTP is thus used by the customer to access the access facility subsequent to their bona fides having been confirmed by the act of accessing the data that was part of the financial transaction, transforming such into an OTP and using the OTP to access the access facility. The merchant is thus assured that only the customer who has legitimate access to use of the financial instrument can access the goods or services from the access facility.

BRIEF DESCRIPTION OF THE DRAWINGS

At least one example of the disclosure will be described with reference to the accompanying drawings, in which.

It should be noted that the same numeral indicates the same or similar element throughout the drawings.

BEST MODES OF THE INVENTION

Figure 1A:
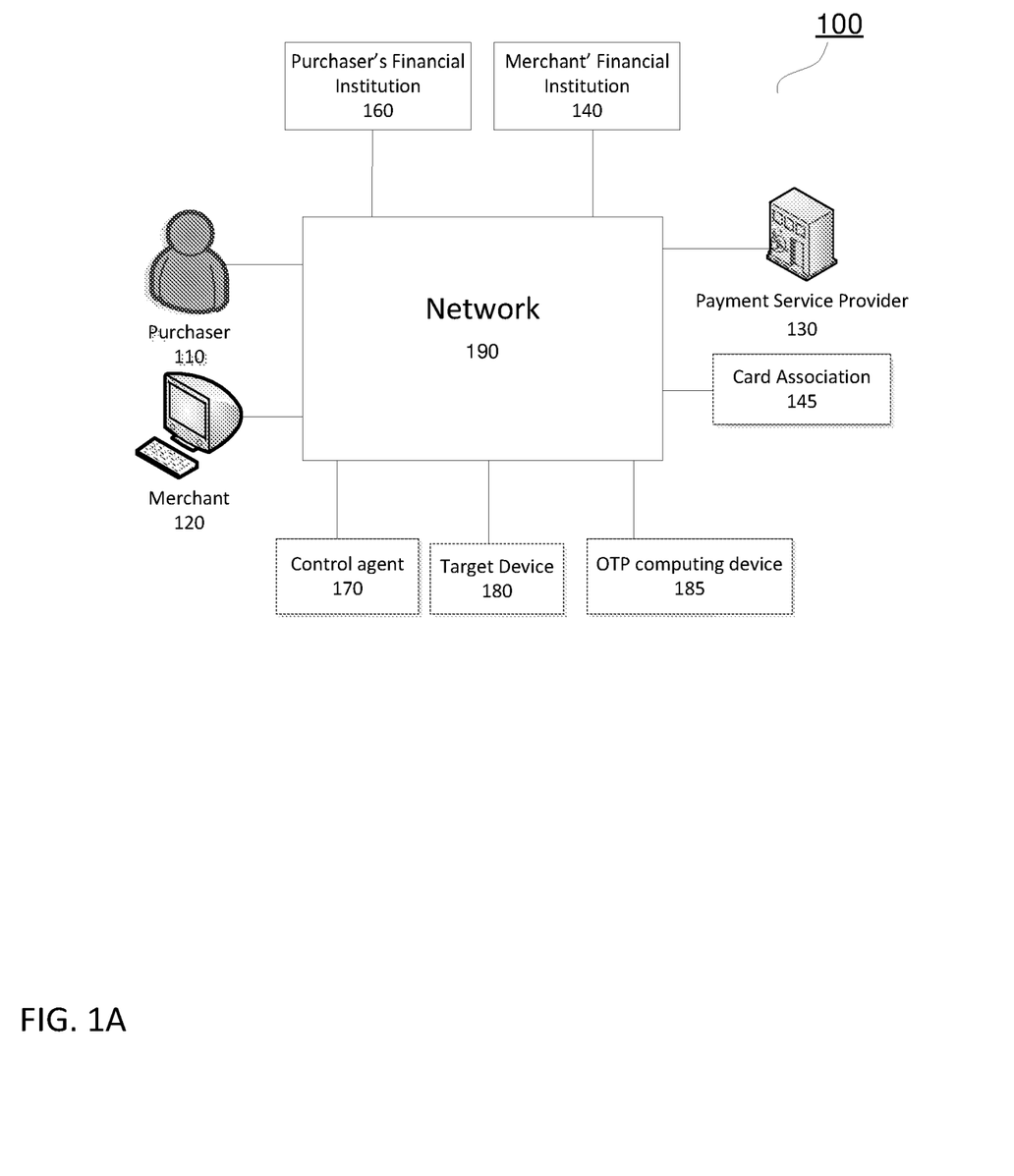
FIG. 1A shows a computer system used to secure a transaction according to an example of the present disclosure.

FIG. 1A shows a computer system 100 used to secure a transaction by generating a one-time-password (OTP) and causing a target device to be programmed with the same OTP for subsequent access by a purchaser in order to complete the delivery cycle of the purchased goods or services.

In FIG. 1, although a purchaser 110, a merchant 120, a payment service provider 130, a merchant's financial institution 140, a card association 145, a purchaser's financial institution 160, a control agent 170, a target device 180 and a OTP computing device 185 are shown as being connected via a network 190 for simplicity, they are typically communicatively coupled via one or more communications networks (not shown). Such networks may for example comprise private networks, public networks, public secured networks, wired networks, wireless networks, Local Area Networks (LANs), Wide Area Networks (WANs), and any combination of the foregoing. In particular, the foregoing networks may be coupled via the Internet (not shown in FIG. 1A). Also, in some cases, one entity may perform the role of multiple parties, for example, the merchant's financial institution 140, the purchaser's financial institution 160 and the payment service provider 130 may be the same bank or financial institution. Interaction or message flow among these entities in FIG. 1A will be described with reference FIG. 2A.

Purchaser 110

The purchaser 110 is a party that purchases goods or services from the merchant 120 with his or her financial instruments such as a store card, a travel card, a charge card, a credit card, a debit card, a prepaid card, a stored value card, a virtual card, a bank account, eWallet, mobile-Wallet and the like. In operation, if the purchaser 110 decides to purchase the goods or services from the merchant 120, the purchaser 110 sends 212, via an online payment webpage, mobile payment facility or similar interface associated with the merchant 120, a payment request to the merchant 120 to process an electronic transaction for a predetermined amount of money. The payment request is sent over a secure mechanism such as Secure Sockets Layer (SSL). The payment request 212 usually includes a transaction ID and account authentication information such as a name, a card number, CVV, CVV2 and the expiration date of his or her financial instrument such as the credit card that the purchaser 110 wishes to use to pay for the goods or services. The payment request may contain information about the goods and services the purchaser 110 intends to purchase, for example the name of the items, the number of items, etc.

Merchant 120

The merchant 120 is an entity that offers the goods or services to the purchaser 110 and receives the payment request from the purchaser 110. Upon receipt of the payment request associated with the predetermined amount of money, the merchant 120 forwards 222 the payment request to the control agent 170. The payment request may also include identification information of the target device 180, which identifies the target device 180 that will deliver the goods or services to the purchaser 110. The target device 180 may be identified 264 via an appropriate allocation system (not shown in FIG. 1A) between target devices and the merchant 120, such as existing locker allocation systems that have been applied to post offices. The allocation system may allocate a target device to the purchaser 110 in a randomly or selectively way. Alternatively, the allocation system may operate with the purchaser 110, the merchant 120 or the control agent 170 to allow selection of a target device for the purchaser 110 to retrieve the goods or services.

The control agent 170 splits the charge amount of the payment request into a plurality of sub-charges that amount to the predetermined amount of money and returns 223 the plurality of sub-charges back to merchant 120. The control agent 170 also generates an assembly key and a mathematical transformation to determine the OTP, which will be described in detail with reference to the control agent 170.

Upon receiving the plurality of sub-charges associated with the payment request from the control agent 170 at the merchant 120, the merchant 120 takes the plurality of sub-charges as separate transactions and send 224 separate sub-payment requests to the payment service provider 130 via for example VPN or SSL over the Internet or a private network. As a result, a plurality of sub-payments corresponding to the plurality of sub-charges are made. In this example, the separate sub-payment requests are automatically generated by the merchant 120 without intervention of the purchaser 110.

In another example, the separate sub-payment requests are generated by the merchant 120 asking the purchaser 110 to provide the plurality of sub-charges. To do this, the merchant 120 may send a security message to the account of the purchaser 110 at the purchaser's financial institution 160 using a secure protocol. The security message contains the plurality of the sub-charges and is accessible to the purchaser 110 through the purchaser's financial institution 160. The purchaser 110 obtains the plurality of the sub-charges contained in the secure message by accessing the account of the purchaser 110 at the purchaser's financial institution 160. Upon the obtaining of the plurality of the sub-charges, the purchaser 110 provides the plurality of the sub-charges to merchant 120. If the plurality of the sub-charges provided by the purchaser 110 are the same as the plurality of the sub-charges returned from the control agent 170, the merchant 120 sends the separate sub-payment requests to cause the plurality of sub-payments to be made.

In practice, to maintain data compatibility across all financial networks, the separated payment requests may be sent to the payment service provider 130 via multiple ISO 20022 messages (or similar) associated with the original payment request instead of inserting additional information to a single one ISO 20022 message. To associate the separate sub-payment requests in the ISO messages with the original payment request, each transaction ID of separate sub-payment requests may be for example the original transaction ID suffixed with .A, .B, .C, .D, etc, or indexed relative to each other. For example, if the original transaction ID is 123456789, then the first separate transaction ID would be 123456789.A, the second transaction ID is 123456789.B, the third transaction ID is 123456789.C and so on up to the number of separate transactions. Moreover, the amount of each separate transaction corresponds to one of the sub-charges determined in accordance with the split method adopted at the control agent 170, and the time stamp varies with the time that each of the separate ISO 20022 messages is transmitted.

Control Agent 170

Figure 1B:
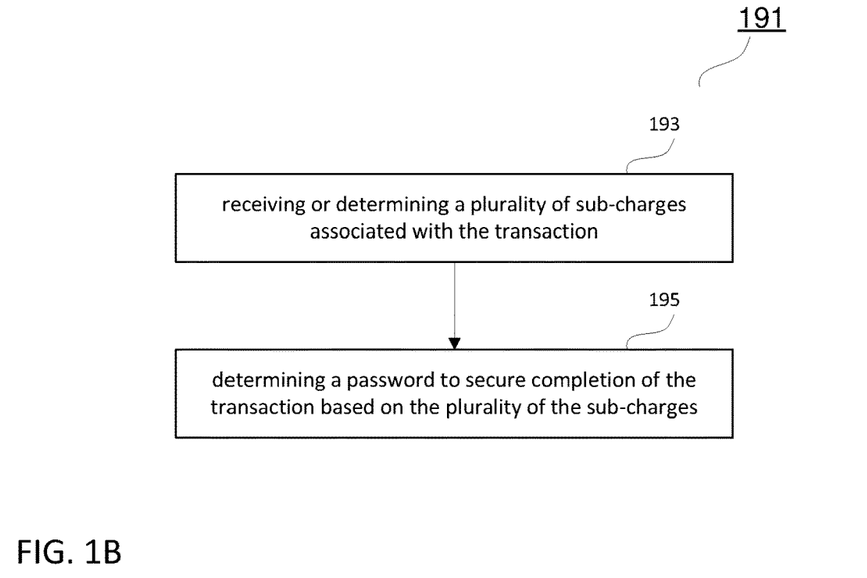
FIG. 1B shows an example method for securing a transaction according to an example of the present disclosure.

FIG. 1B shows an example method 191 for securing a transaction according to an example of the present disclosure. Although the method 191 is described as being performed by the control agent 170 in this example, the method 191 can be performed by other entities in the computer system 100.

The control agent 170 is an entity that generates the OTP and causes the target device 180 to be programmed with the same OTP. Upon receipt of the original payment request associated with the predetermined amount of money at the control agent 170, the control agent 170 determines 193 a plurality of sub-charges associated with the transaction by for example splitting the predetermined amount of money into two or more sub-charges. In another example, the control agent 170 may also receive 193 a plurality of sub-charges associated with the transaction.

Splitting the predetermined amount of money may be performed in a random manner, for example using a computer software application including a random number generator. As a result, the control agent 170 returns 223 the plurality of sub-charges to the merchant 120.

The sum of the plurality of sub-charges is equal to the predetermined amount of money. This is important for a variety of reasons, including ensuring that the purchaser 110 makes a payment to the merchant for the agreed predetermined amount of money only without the need for subsequent balancing or any dummy transactions, and also for the purpose of the predetermined amount acting as a denominator in foreign currency exchange.

In an implementation, the computer software application including a random number generator determines the number of sub-charges n, and then applies the random number generator to form each of the sub-charges with the last sub-charge being equal to the sum of the previous sub-charges subtracted from the predetermined amount. The following equation represents the relationship between the predetermined amount and the plurality of sub-charges:

$$\sum_{n}^{n} x_n = Y$$

where
n is the number of sub-charges generated;
$x_n$ is each of the sub-charges; and
Y is the predetermined amount agreed between the purchaser 110 and the merchant 120.

For example, the predetermined amount of money is $100, which may be split as follows:

Split Method 1: Two amounts, whereby the first amount is randomly generated as a sub-charge of $75.75 with a balancing sub-charge of $24.25, such that total amount of the sub-charges is equal to the predetermined amount of $100. As a result, the sub-charges may form OTP numerical sub-components of 7575 and 2425. In this example, the decimal points are disregarded.

Split Method 2: A plurality of sub-charges up to n sub-charges, whereby the first sub-charges is randomly generated as a number less than the predetermined amount, and each subsequent sub-charges is randomly generated from the balancing amount of the predetermined amount minus any prior generated sub-charges, with the final sub-charge n being equal to such an amount that makes the sum of all the generated sub-charges equal to the predetermined amount. For example, $24.50, $33.33, $18.72 with balancing amount of $100−($24.50, $33.33, $18.72)=$23.45. As a result, the OTP numerical sub-components are formed as 2450, 3333, 1872 and 2345. Similarly, the decimal points are disregarded in this example.

It should be noted the above methods are exemplary only, and there are other methods that can be used to form the plurality of sub-charges.

In addition to forming the plurality of sub-charges associated with the predetermined amount of money, the control agent 170 determines 195 the OTP associated with the transaction based on the plurality of sub-charges. Since the OTP is determined for each transaction based on the plurality of sub-charges, each transaction has its own unique password that is not likely to be the same as the password for another transaction. Such a password determination mechanism does not only enhance the security of the transaction, but also makes it unnecessary for a user to remember a password or change the password manually.

In this example, in order for the control agent 170 to determine the OTP, an assembly key and a mathematical transformation are generated by the control agent 170.

The assembly key is descriptive information that defines a manner that the sub-charges are assembled, in this example, particularly, the order in which the sub-components are arranged. The assembly key may be Linear Sequence Coding, which may for example indicate that all or a designated number of the sub-charges are arranged in a string disregarding decimal points, from highest to lowest (or lowest to highest). As a result of this, an assembly sequence consisting of all or a designated number of sub-components is formed. For example, in Split Method 1 the resulted assembly sequence could be 75752425 (or 24257575), and in Split Method 2 the resulted assembly sequence could be the highest two values to form 33332450 or the highest 3 values to form 333324502345 or the lowest two values in ascending order to form 18722345.

The mathematical transformation used to compute the OTP based on the assembly sequence may include non-linear and/or linear mathematical operation. Such mathematical transformation may be applied by a computing device such as a public key encryption device (not shown in FIG. 1A).

The following equation is an example of how the control agent 170 determines the OTP from the plurality of sub-charges based on the assembly key and the mathematical transformation.

$$OTP = Fn(fn(x_1 \ldots x_n), Ak_1 \ldots Ak_n) \quad \text{Equation (1)}$$

where $x_1$ to $x_n$ are the plurality of sub-charges that sum to the predetermined amount of money, which are manipulated in a specific way defined by the assembly key (denoted by fn herein) to form the assembly sequence. $Ak_1 \ldots Ak_n$ are random numbers generated by the control agent 170 using a variety of means. OTP is then formed from the mathematical transformation (denoted by Fn) of $fn(x_1 \ldots, x_n), Ak_1 \ldots Ak_n$.

In another example, the resulted assembly sequence is not necessarily subject to further mathematical transformation, and the assembly sequence itself could function as the OTP.

In a further example, the mathematical transformation may not necessarily be performed on the sub-components arranged in the order defined by the assembly key; instead, the mathematical transformation may be applied to the sub-components arranged in any order.

The control agent 170 then sends 250 the OTP to the target device 180, and transmits to an electronic address (not shown in FIG. 1A) previously nominated by the purchaser 110 the assembly key. The control agent 170 transmits 260 the mathematical transformation to the OTP computing device 185. In another example, the control agent 170 may not send the OTP to the target device 180 after the OTP is determined; instead, the control agent 170 advises the target device 180 of the OTP upon receipt of an OTP confirmation request from the purchaser 110 or the merchant 120. In this case, the control agent 170 may store the OTP in a datastore.

In this example, the assembly key or the mathematical transformation may not necessarily be sent securely, and can be sent via a variety of communications means to the electronic address or the OTP computing device 185 since even if the assembly key or the mathematical transformation is intercepted, the OTP cannot be determined without the plurality of sub-charges, which are processed by the existing secure network protocols and devices and are only accessible by the authorised user of the financial instrument of the purchaser 110. The electronic address may be an e-mail address, an SMS number, an MMS number or other addressable means. The electronic address may be a unique identifier associated with a software application loaded on a smartphone or mobile device. It may also be desirable to utilise various levels of commercially available technology including simple encryption or more complex encryption techniques, as known to a person skilled in the art.

In another example, both the assembly key and the mathematical transformation can be sent to the OTP computing device 185 by the control agent 170 in order to regenerate the OTP.

In each of the above examples, the assembly key, the mathematical transformation and the OTP generated by the control agent 170 may be stored in the control agent 170.

Payment Service Provider 130

The payment service provider 130 may be a gateway that processes a payment request from the merchant 120.

Upon receipt of the separate sub-payment requests from the merchant 120, the payment service provider 130 sends 232 the separate sub-payment requests to the merchant's financial institution 140 to debit 242, 252 the purchaser's financial instrument 160 in conjunction with the card association 145.

Merchant's Financial Institution 140 and Purchaser's Financial Institution 160

The merchant's financial institution 140 may be a bank associated with the merchant 120, and similarly, the purchaser's financial institution 160 may be a bank associated with the purchaser 110. The purchaser's financial institution 160 either authorises or declines the separate sub-payment requests and sends feedback 254, 244, 234, 226 to the merchant 120, which in turn notifies 227 the control agent 227 of the result. For example, the first separate sub-payment request may be acknowledged as authorised by the purchaser's financial institution 160 with subsequent separate sub-payment requests not being authorised for some reasons such as low balance, network communication failure, etc. In such a situation, the control agent 170 retransmits 228 the particular separate sub-payment request that failed previously in an attempt to achieve authorisation with the purchaser's financial institution 160 or causes the original transaction to be cancelled if necessary. In this example, the authentication processes between the merchant 120 and the purchaser's financial institution 160 are performed on the separate sub-payment requests, so the existing secure network protocols and devices can be used such that no additional security mechanism needs to be introduced to process the separate sub-payment requests. As a result, the plurality of sub-charges are only accessible by the authorised user of the financial instrument of the purchaser 110.

If all the separate sub-payment requests associated with the original payment request are authorised by the purchaser' financial institution 160, the purchaser 110 may be notified 216 that the transaction is successful and his or her financial instrument has been debited with the predetermined amount of money. Optionally, this may be together with details of the location of the target device 180. In other examples, the purchaser 110 may not be notified of the successful transaction.

Card Association 145

The card association 145 may be an entity that issues the purchaser's financial instrument 160 such as American Express, Visa Inc., Mastercard Worldwide, JCB, Discover, Diners Club, Carte Bancaire, PayPal, China Union Pay, DanKort and the like.

OTP Computing Device 185

The OTP computing device 185 may be a dedicated device as shown in the example shown in FIG. 1A, which receives the mathematical transformation from the control agent 170 and the assembly sequence from the purchaser 11 to regenerate the OTP for the purchaser 110 to retrieve the goods or services from the target device 180.

Alternatively, the OTP computing device 185 may be a programmable consumer electronics device with appropriate software. Examples of the consumer device may include a smart phone, a tablet, a phablet, a personal computer, a game console, or other programmable personal electronic devices. The same OTP computing device 185 may be used by the purchaser 110 to make the payment.

In this example, after receiving the notification 216 of successful transaction, the purchaser 110 can access 258 his or her account statement associated with the financial instrument at the purchaser's financial institution 160 that has been debited with the predetermined amount of money and obtain 214 the number of sub-charges and the individual amounts of each sub-charge. In another example, the purchaser 110 may check the account statement associated with his or her financial instrument after making the purchase to determine the number of sub-charges and/or the amount of each charge without being notified to do so.

The purchaser 110 then retrieves the assembly key from the electronic address to assemble the sub-charges or sub-components into an assemble sequence in a way indicated by the assembly key. The purchaser 110 then manually enters or automatically sends 220 the assembly sequence to the OTP computing device 185, which calculates or regenerates the OTP based on the assembly sequence received from the purchaser 110 and the mathematical transformation sent from the control agent 170. In this example, the OTP computing device 185 transmits 256 the OTP to the target device 180 upon request by the purchaser 110. In another example, the OTP computing device 185 may display the OTP to the purchaser 110 for manual entry by the purchaser 110 into the target device 180.

In another example, if the control agent 170 did not send the OTP to the target device 180 when the OTP was determined at the control agent 170 during the purchase process of the goods or services, the OTP computing device 185 may send an OTP confirmation request to the control agent 170, which in turn causes the target device 180 to be advised of the OTP determined at the control agent 170. Alternatively, the purchaser 110 may send the OTP confirmation request directly to the merchant 120, which in turn causes the control agent 170 to advise the target device 180 of the OTP.

In each of the foregoing examples, if the OTP received from the OTP computing device 185 at the target device 180 matches that received from the control agent 170, the target device 180 performs delivery or access of the goods or services as appropriate to complete the transaction.

Alternatively, if the control agent 170 did not send the OTP to the target device 180, the target device 180 may send the OTP to the control agent 170 that will then cross match the OTP received to the OTP stored in for example a datastore and send a result of the cross match to the target device 180 to allow delivery of the goods or services if a match is found.

In practice, the OTP computing device 185 may include a management software agent residing thereon. The management software agent may perform the following tasks:
   a) providing a unique location, irrespective of IP address, for communications with the control agent 170. This is achieved by each management software agent having a unique serial or identification number and where available from the OTP computing device or any connected peripheral device, capturing, storing and transmitting global positioning system (GPS) location data and/or cell tower location data;

b) capturing from the OTP computing device 185 a unique characteristic such as an International Mobile Equipment Identity (IMEI) or Electronic Serial Number (ESN) or UUID in the case of cellular phone, a serial number, an MAC address and any other unique characteristic of the OTP computing device 185;

c) transmitting these unique characteristics to the control agent 170, upon request from the control agent 170;

d) accepting the assembly sequence via a pre-existing human to device interface;

e) accepting the mathematical transformation from the control agent 170;

f) determining the OTP based on steps d) and e);

g) allowing for secure communications back to the control agent 170 from the purchaser 110; and h) transmit the determined OTP to the target device 180 over a network.

Target Device 180

In the example shown in FIG. 1A, the target device 180 receives 250 the OTP from the control agent 170 and stores it in its memory. At a later time, the target device 180 may receive a regenerated OTP from the OTP computing device 185. Upon receipt of the OTP from the OTP computing device 185, the target device 180 determines if the OTP received from the control agent 170 is identical with the OTP regenerated by the OTP computing device 185. If yes, the target device 180 deliver the goods or services to the purchaser 110; otherwise, the target device 180 declines the access of the purchaser 110 to the goods or services.

In another example, the target device 180 may be advised of the OTP by the control agent 170 in response to an OTP confirmation request sent from the OTP computing device 185 to control agent 170 or merchant 120.

The target device 180 is an access facility such as a physical facility that has an electronic controlled access mechanism, which may be remotely programmed with an OTP, and authenticates later access of the purchaser 110 to the goods or services if the OTP received 250 from or advised of by the control agent 170 matches the OTP received 256 from the OTP computing device 185. The target device 180 may be for example a locker, a parcel locker, a deposit box, a refrigerated locker, a kiosk, a self-service printing facility, a vending machine, a ticket machine or other self-service storage/retrieval means, where physical items are shipped or stored to the target device 180 and retrieved by the purchaser 110 using an OTP that matches the OPT it holds. The target device 180 has been applied to the services provided by for example US Postal Service, Australia Post, Österreichische Post AG, Deutsche Post, Singapore Post, Norway Post, Post Danmakr, UPS, FedEx, Amazon, Coles 'Click and Collect' services.

The target device 180 includes the secure electronic parcel lockers that are automated booths for the self-service collection of parcels, such as those available from LogiBag in France, KEBA in Austria, or TZ Ltd in Australia.

Alternatively, the target device 180 is an access facility such as an electronic or digital facility. In this case, content is stored on servers and accessed via conditional access systems, where such systems only permit access upon entry or receipt of the correct OTP. For example, the target device 180 may be a cable or pay television channel such as Foxtel or ESPN or other electronic entertainment services or gaming networks (e.g. Xbox Live, PlayStation Network), a pay per use or subscription based electronic network offering downloadable/streaming content, including audio visual media, software, applications and documents. Examples of content access facilities may include Apple Inc.'s iTunes, content stored on the Akamai network, or on Amazon's network.

Other Variations

It will be appreciated by persons skilled in the art that numerous variations and/or modifications may be made to the disclosure as shown in the specific examples without departing from the scope of the disclosure as broadly described. Those variations and/or modifications are exemplified as follows:

Control Agent

Figure 2A:
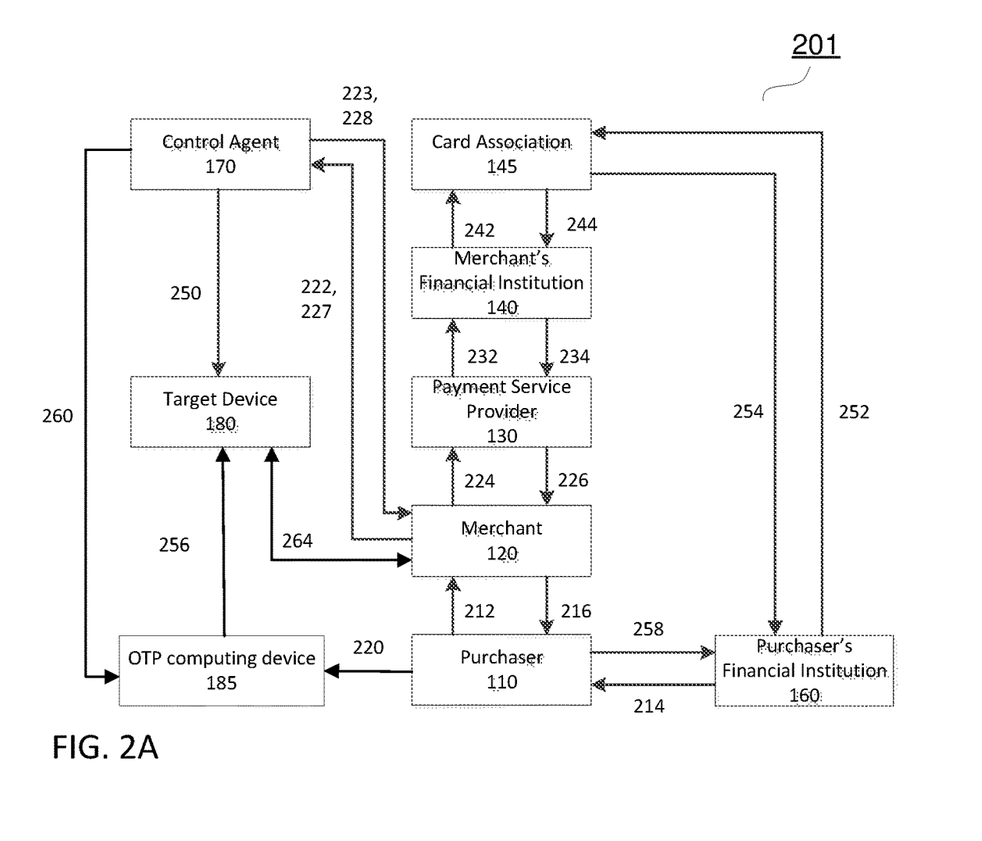
FIGS. 2A-D indicate message flows in the computer system used to secure a transaction according to examples of the present disclosure.

Although the control agent 170 shown in FIG. 1A and FIG. 2A operates with the merchant 120 as an independent entity, the control agent 170 may also reside on the computer systems of the merchant 120 as part of the merchant 120 in the form of a physical entity or a software application.

Figure 2B:
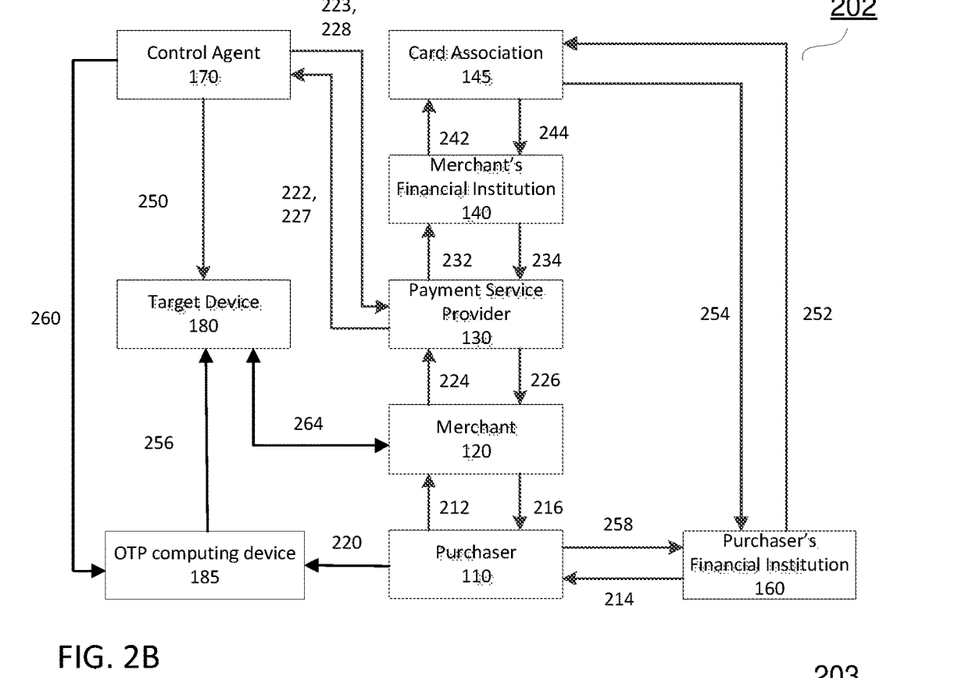
Figure 2C:
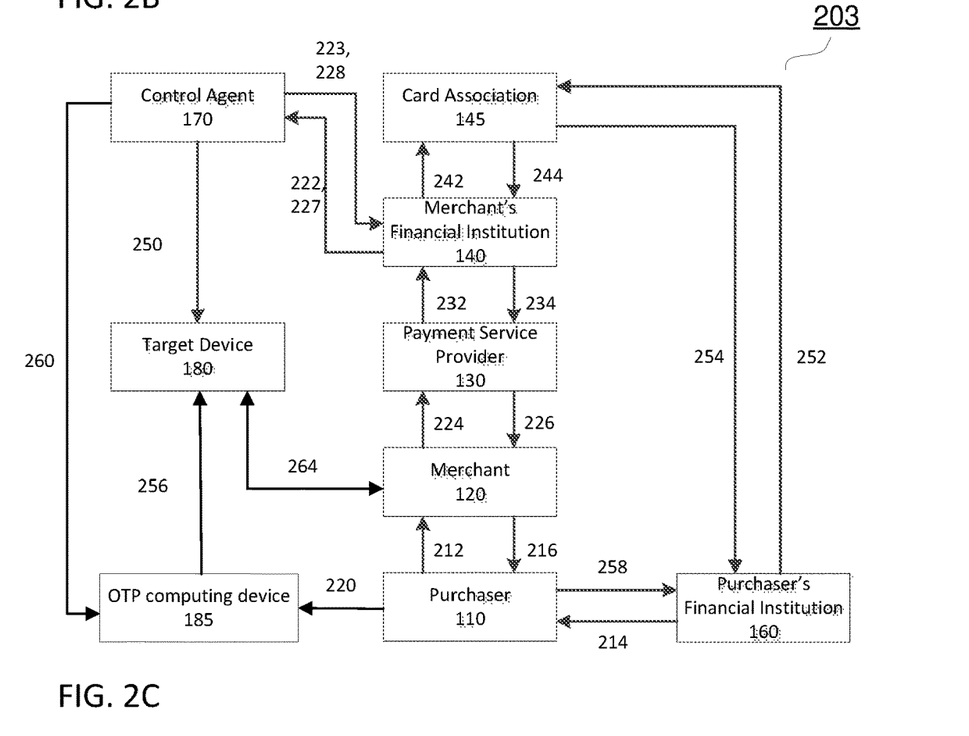
Figure 2D:
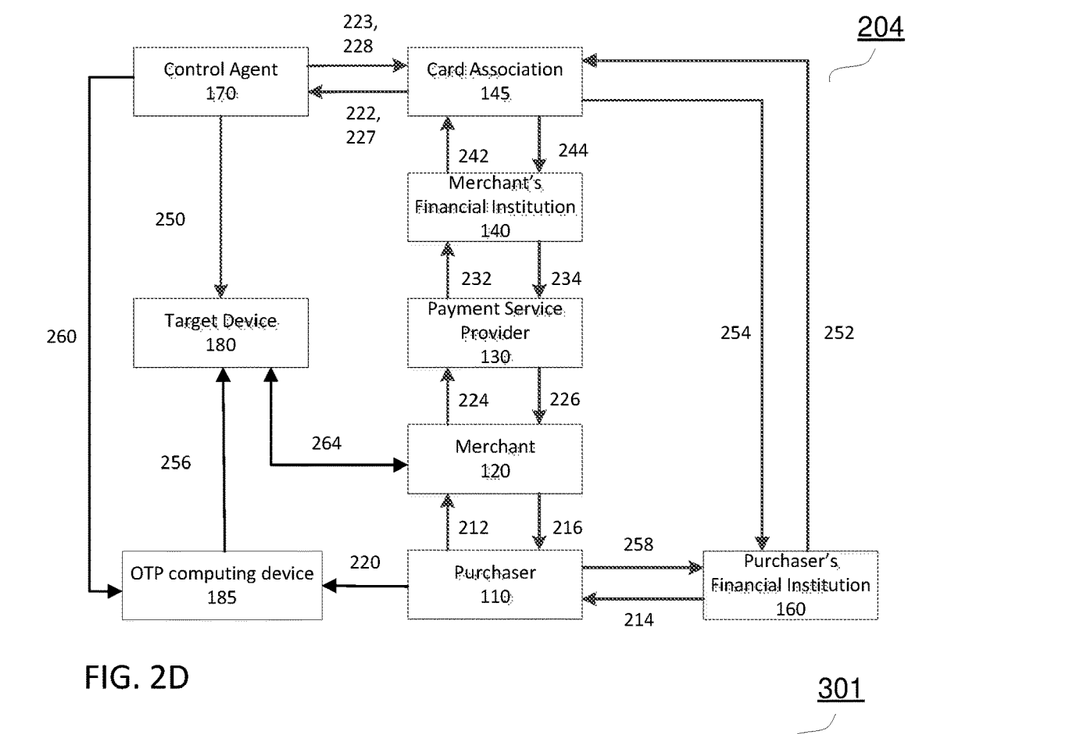
Figure 3A:
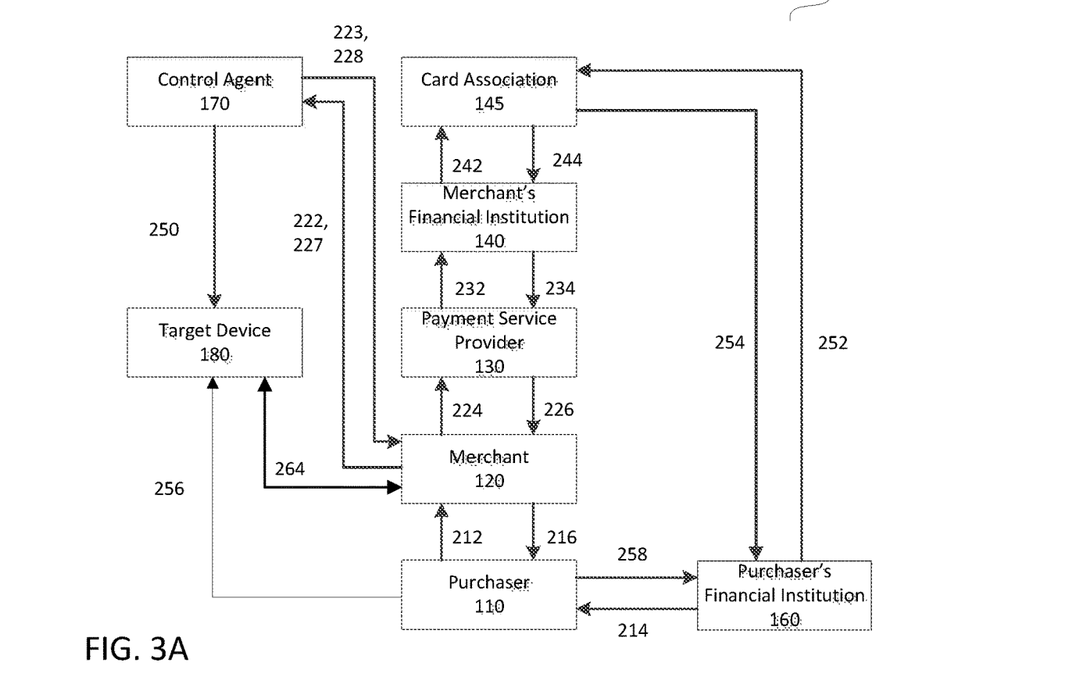
FIGS. 3A-D indicate message flows in the computer system used to secure a transaction according to other examples of the present disclosure.
Figure 3B:
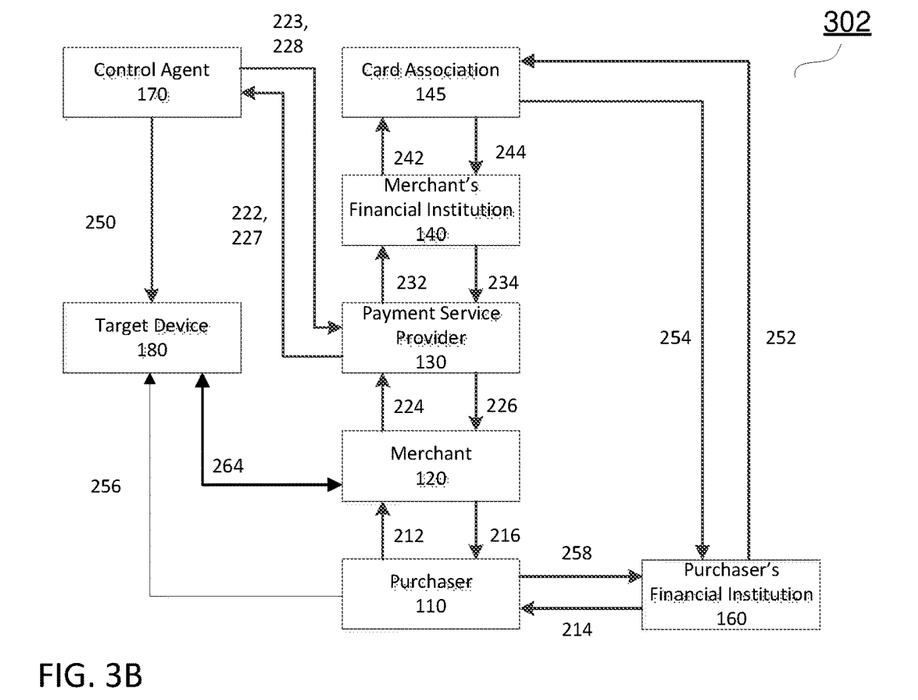
Figure 3C:
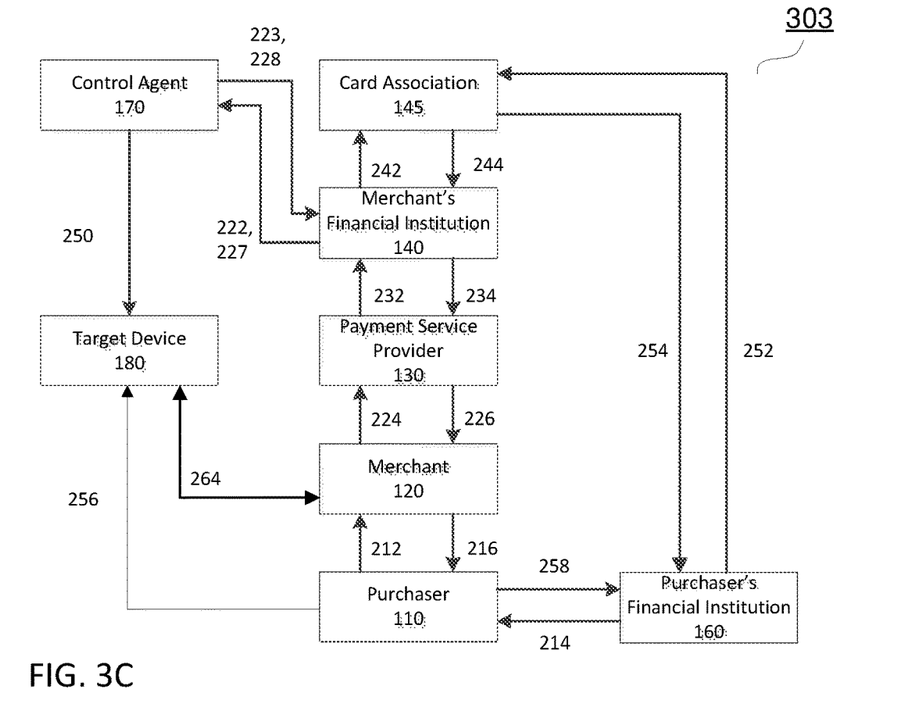
Figure 3D:
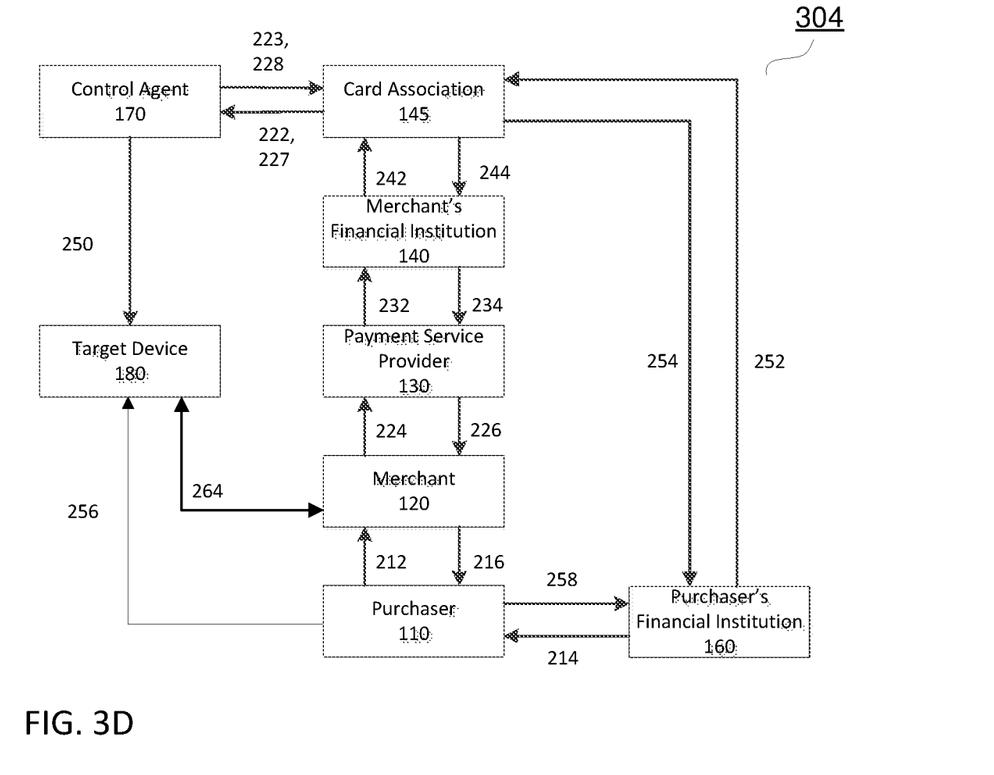

Other than the merchant 120, the control agent 170 may operate with the payment service provider 130 (as shown in FIG. 2B), the merchant's financial institution 140 (as shown in FIG. 2C), or the card association 145 (as shown in FIG. 2D). Similarly, the control agent 170 may reside on the computer system of the payment service provider 130, the merchant's financial institution 140 or the card association 145 as part of the entities in the form of a physical entity or a software application.

Alternatively, the control agent 170 can be logically or physically distributed among any combination of any foregoing entities. For example, the calculating and splitting of the predetermined amount of money may be performed by the merchant 120; the generation of the assembly key and the mathematical transformation may be performed by the payment service provider 130; the generation of the OTP and transmission of the OTP to the target device 180 may be performed by the merchant's financial institution 140; and the transmission of mathematical transformation and the assembly key may be performed by the card association 145. The advantages of doing so include reducing common mode failure of the software, increasing fault tolerance, optimising network and bandwidth management, improving security, and/or catering to differing communications and interface protocols over different networks and systems. Depending upon the location and functional split of the control agent 170, the data packet structure may need to comply with the substantive requirements of the ISO 20022 message (or its successor or equivalent) in order to allow the transaction to be processed across different entities.

In another variation, the purchaser 110 may manually enter or automatically send the OTP generated from the OTP computing device 185 to the control agent 170 instead of the target device 180, and the control agent 170 instructs the target device 180 to perform its delivery, release, download or access function if the OTP received from the purchaser 110 matches the OTP stored at the control agent 170.

OTP Computing Device

In the example described above, the OTP presented by the OTP computing device 185 to the target device 180 is determined by the OTP computing device 185 based on the assembly sequence and the mathematical transformation. The OTP may also be directly received from the control agent 170. In this case, the control agent 170 may confirm the linkage between the OTP computing device 185 and the purchaser 110 by a) transmitting the assembly sequence generated at the control agent 170 in encrypted form to the OTP computing device 185;
b) requiring the purchaser 110 to retrieve from his or her financial instrument the plurality of sub-charges and enter into OTP computing device 185 the assembly sequence formed based on the sub-charges according to the sequence key; and
c) confirming that the two assembly sequences match.

Once the two assembly sequences match, indicating that the OTP computing device 185 has been linked to the purchaser 110 by means of a correctly entered assembly sequence, the management software agent on the OTP computing device 185 may then allow the purchaser 110 to select a 4 or 6 digits PIN or a password of their choice. The OTP computing device 185 may then be designated to receive the encrypted OTP directly from the control agent 170 without requiring the assembly sequence to be entered each time and display the OTP upon correct entry of customer PIN or password.

The control agent 170 may for any transaction generate and transmit the plurality of sub-charges to the financial instrument of the purchaser 110 and require the purchaser 110 to retrieve the plurality of sub-charges and enter them into the OTP computing device 185 in the correct order indicated by the assembly key as a means of revalidating the linkage between the purchaser 110 and the OTP computing device 185. The frequency of revalidation may be for example:
i) event-based, such as a risk score determined by other methods occurring,
ii) time-based such as every month, quarter, or year,
iii) it may be value based such as for transactions over a certain threshold value for the predetermined amount or once a total value of transactions has been processed,
iv) it may be volume based following a set number of transactions, or,
v) it may be location based, if OTP computing device 185 is determined to be outside, or inside, a specified geographic area.

In the example and the variation described above, an OTP computing device 185 is needed to regenerate an OTP to confirm with the target device 180 for the access to the goods or services. However, if the generation of the OTP at the control agent 170 does not need the mathematical transformation, which means the assembly sequence itself can be used as an OTP, the OTP computing device 185 may not be needed for the purchaser 110 to regenerate the OTP. As a result, the purchaser 110 may just need to assemble or sequence the sub-charges as indicated by the assembly key retrieved from the electronic address to determine the assembly sequence as the OTP. In this case, the OTP computing device 185 may be disregarded in the system, and the message flows among other entities are shown in FIGS. 3A-D, which are similar to those in FIGS. 2A-D except that the purchaser 110 presents 256 the assembly sequence directly to the target device 180 without the need of the OTP computing device 185. Accordingly, the control agent 170 may not need to send the mathematical transformation to the OTP computing device 185.

For each alternative described, a person skilled in art would understand the modifications to the message flows described to achieve these alternatives.

Foreign Currency Exchange

As frequently occurs, the currency used at the merchant 120 and the currency of the financial instrument of the purchaser 110 may differ. In such a case, both the merchant's currency and the purchaser's currency are normally available on the account statement of the purchaser 110. The tracking of exchange rate information is complex and is subject to change at various times within the transaction process. There is also no mechanism within the ISO 20022 or other protocols for the control agent 170 to capture and store the relevant exchange rate. In this case, the sum of the plurality of the sub-charges is at least substantially equal to the payment amount where the variation is due to the foreign currency exchange variation.

To allow for exchange rate variations, the control agent 170 may utilise instead of absolute values of the numeric sub-charges the fraction of each of the sub-charges as calculated using the predetermined amount as a denominator, or normalised splitting.

In particular, where Y is the predetermined amount of money, and $x_1 \ldots x_n$ are the numeric sub-charges as split by the control agent 170, wherein $$\sum_{n}^{n} x_n = Y,$$

or $$1 = \frac{x_1}{Y} + \frac{x_2}{Y} + \ldots + \frac{x_n}{Y}$$

where, $$\frac{x_1}{Y}$$

can be considered as normalised sub-charge. For example, the currency of the purchaser 110 is Euro and the currency of the merchant 120 is US dollar, and an exchange rate of f would apply.

1 US dollar=f EUROs

If the above exchange rate is applied to the normalised splitting, it can be seen that the effect of the exchange rate on the absolute splitting is removed by using the predetermined amount as a denominator. Take a transaction of USD 100 as an example, if the control agent 170 splits the $100 into two amounts of $60 and $40, then the normalised sub-charges calculated from normalised splitting are 0.6 and 0.4.

If applying an exchange rate of 0.8 to convert US dollar to Euro, the split amounts would be a) $60=€ 48, and b) $40=€ 32, and the predetermined amount in EURO is € 80. As a result, the normalised sub-charges resulting from the normalised splitting on the predetermined amount in EURO are 0.6 and 0.4, same as in the US dollar amount.

In practice, each of the normalised sub-charges can be rounded to the nearest 2 decimal places, and will be accurate to within an error tolerance of ε. Where different currencies are in use, the system will not be subject to further mathematical transformation as the error ε in conjunction with rounding will introduce unknown errors in the generation of the OTP. As a result, the OTP may be generated only by sequencing the normalised sub-charges as indicated by the assembly key.

The Assembly Key and the Mathematical Transformation

As described with reference to the above examples, the assembly key and the mathematical transformation are dynamically generated by the control agent 170 and transmitted between different entities for regeneration of the OTP; alternatively, the assembly key and the mathematical transformation may be predetermined and agreed upon by related entities such as the control agent 170, the OTP computing device 185. In this case the assembly key and the mathematical transformation do not need to be generated and transmitted each time the control agent 170 determines the OTP, which reduces computing burden of the control agent 170.

Hardware

Figure 4:
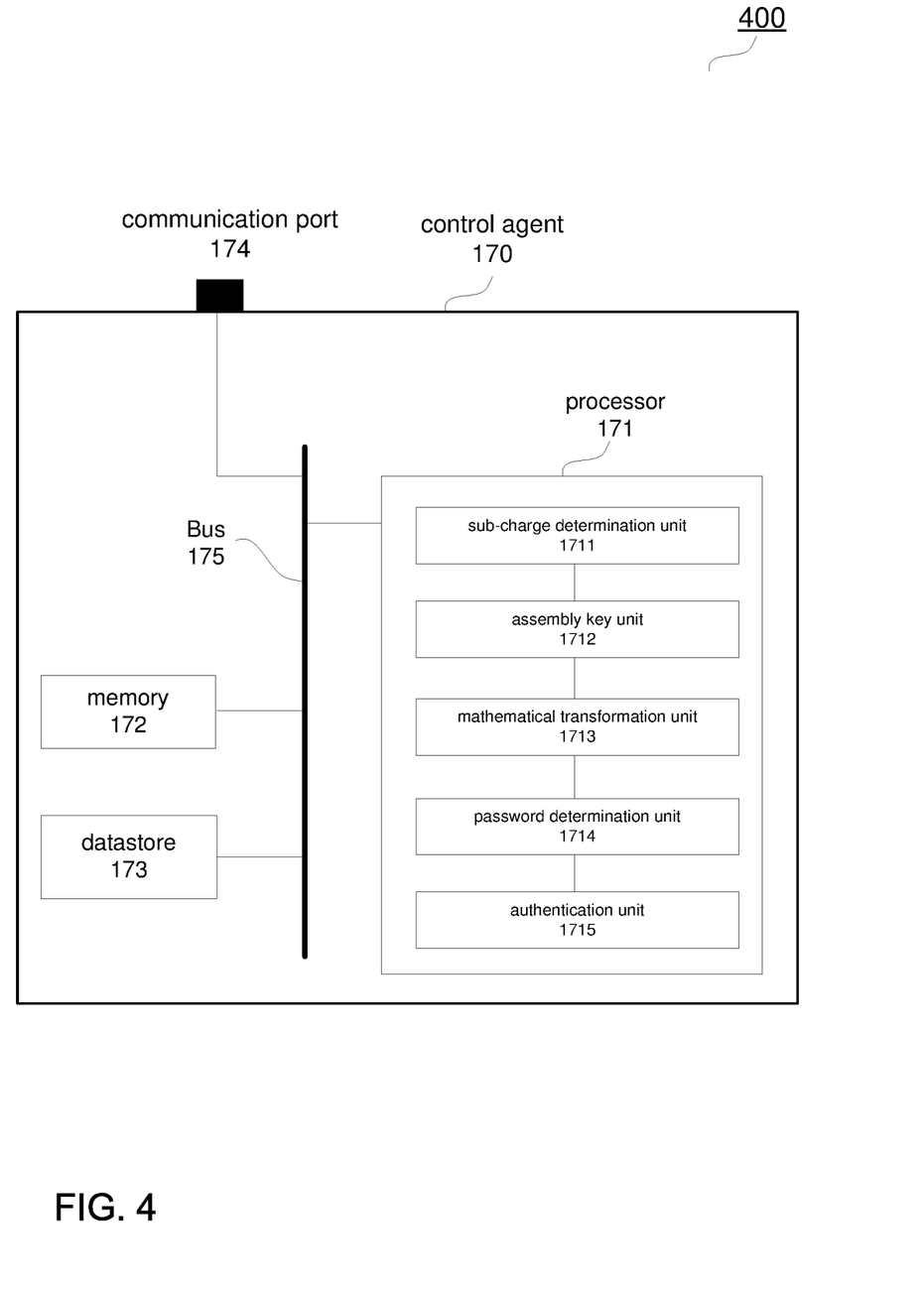
FIG. 4 shows a schematic diagram of a control agent used to secure a transaction according to an example of the present disclosure.

FIG. 4 is a schematic diagram 400 of the control agent 170 used to secure a transaction according to an example of the present disclosure. The control agent 170 shown in FIG. 4 includes a processor 171, a memory 172, a datastore 173, a communication port 174 and a bus 174. The processor 171, the memory 172, the datastore 173, the communication port 174 are connected through the bus 175 to communicate with each other.

The processor 171 performs instructions stored in the memory 172 to implement the foregoing processes described with reference to the control agent 170 according to the disclosure.

The processor 171 further includes a sub-charge determination unit 1711, an assembly key unit 1712, a mathematical transformation unit 1713, a password determination unit 1714, and an authentication unit 1715. The separate units 1711 to 1715 of the processor 171 are organised in a way shown in FIG. 4 for illustration and description purpose only, which may be arranged in a different way. Specifically, one or more units in the processor 171 may be part of another unit. For example, the sub-charge determination unit 1711, the assembly key unit 1712 and the mathematical transformation unit 1713 may be integrated with the password determination unit 1714. In another example, one or more units, particularly, the authentication unit 1715, in the processor 171 shown in FIG. 4 may be separate from the processor 171 without departing from the scope of the present disclosure.

Further, depending on the intended functions of the control agent 171, one or more units 1711 to 1715 may not be necessary for the control agent 171 to perform the functions. For example, the authentication unit 1715 may not be necessary for the control agent 171 to determine the OTP.

The sub-charge determination unit 1711 generates the plurality of sub-charges as described with reference to above examples, as indicated by step 193 in FIG. 1B. Specifically, the sub-charge determination unit 1711 splits the original charge into the plurality of sub-charges based on for example the random number generator. Upon generation of the plurality of sub-charges, the processor 171 transmits the plurality of sub-charges to the communication port 174 via the bus 174. Then the control agent 170 sends the plurality of sub-charges to the merchant 120 through the communication port 174, as described above.

The assembly key unit 1712 generates the assembly key that defines the manner of assembling the plurality of sub-charges as described to form the assembly sequence. Upon generation of the assembly key, the control agent 170 may transmit the assembly key to the electronic address previously nominated by the purchaser 110, as described above.

The mathematical transformation unit 1712 generates the mathematical transformation that may be used in determining the OTP. The mathematical transformation generated by the mathematical transformation unit 1712 may be transmitted by the control agent 170 to the OTP computing device 185 as described above.

With the plurality of sub-charges, the assembly key and the mathematical transformation generated by the sub-charge determination unit 1711, the assembly key unit 1712 and the mathematical transformation unit 1713, respectively, the password determination unit 1714 may determine, as indicated by step 195 in FIG. 1B, the OTP by applying the plurality of sub-charges, the assembly key and the mathematical transformation to Equation (1) as described above. As can be seen, the OTP is determined for each transaction, which means each transaction has its own unique password that is not likely to be the same as the password for another transaction. Such a password determination mechanism does not only enhance the security of the transaction, but also makes it unnecessary for a user to remember a password or change the password manually.

The processor 171 may further send the OTP determined by the password determination unit 1714 to the target device 180 from the control agent 170 via the communication port 174.

In another example, instead of generating the plurality of sub-charges, the assembly key and the mathematical transformation, the control agent 170 may receive 193 the plurality of sub-charges, the assembly key and the mathematical transformation from a third-party entity and apply these information to Equation (1) as described above to determine the OTP without departing from the scope of the present disclosure.

The datastore 173 is used to store data, which may be organised in the form of data structure such as a database. In the examples described above, particularly, the data stored in the datastore 173 include the OTP generated by the processor 171.

The communication port 174 is used by the control agent 170 to communicate with other entities such as the target device 180, the OTP computing device 185, the merchant 120 described with reference to other figures in any appropriate manner. Although only one communication port 174 is shown in FIG. 4, there can be more communication ports included in the control agent 170 as known to a person skilled in the art. The ports may also be logical software based ports.

As described above, the control agent 170 may not send the OTP to the target device 180. In this case, the processor 171 may store the OTP in the datastore 173. When authentication of the completion of a transaction is needed, the control agent 170 may receive an OTP from the target device 180 through the communication port 174. The authentication unit 1715 of the processor 171 then cross matches the OTP received to the OTP stored in the datastore 173. The processor 171 may send a result of the cross match to the target device 180 to authenticate the completion of the transaction if a match is found, for example, allowing delivery of the goods or services to the purchaser 110.

Since the control agent 170 could form part of the system of many of the parties involved in the message flow, in turn this hardware could reside on any of those systems. It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "processing" or "computing" or "calculating", or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A computer-implemented method for securing a transaction between a purchaser and a merchant, said method comprising:
   receiving, by a processor of a control agent, an original payment request associated with the transaction between the purchaser and the merchant and a predetermined amount of the transaction;
   splitting, by the processor of the control agent, the predetermined amount associated with the transaction into a plurality of sub-charges associated with the transaction by using a random number generation function to randomize how the plurality of sub-charges are formed from the predetermined amount;
   generating an assembly sequence by: i) generating one or more sub-components by determining one or more string data values from one or more corresponding numerical data values of the sub-charges; and ii) processing, using an assembly key, the sub-components to form the assembly sequence as an ordered arrangement of a determined number of the one or more sub-components in accordance with an order of sub-component arrangement defined by the assembly key;
   determining, by the processor of the control agent, a one-time password using the generated assembly sequence;
   receiving identification information of a target device associated with goods and/or services purchased by the transaction;
   transmitting, by the control agent, the one-time password to the target device over a network based on the identification information;
   providing, by the control agent, the plurality of sub-charges to the merchant;
   sending, by the merchant, a plurality of sub-payment requests corresponding to the plurality of sub-charges to a purchaser's financial institution via a payment service provider via a plurality of electronic messages associated with an original payment request;
   transmitting the assembly key, by the processor of the control agent, to an electronic address of the purchaser of the transaction; and
   in response to the purchaser accessing the plurality of sub-charges via the purchaser's financial institution and generating the one-time password based on the assembly key and the plurality of sub-charges accessed via the purchaser's financial institution:
   authenticating the purchaser as an authorized user of a financial instrument used to make the purchase of the transaction; and
   allowing the purchaser access to the target device.

2. The computer-implemented method for securing a transaction according to claim 1, wherein determining the password based on the plurality of sub-charges comprises performing a mathematical transformation on the sequenced plurality of sub-charges to determine the password.

3. The computer-implemented method for securing a transaction according to claim 1, wherein determining the password based on the plurality of sub-charges comprises performing a mathematical transformation on the plurality of sub-charges to determine the password.

4. The computer-implemented method for securing a transaction according to claim 1, wherein the sum of the plurality of sub-charges is substantially equal to a charge amount of the transaction.

5. The computer-implemented method for securing a transaction according to claim 4, further comprising making a plurality of sub-payments corresponding to the plurality of sub-charges.

6. The computer-implemented method for securing a transaction according to claim 4, further comprising:
   receiving a further plurality of sub-charges; and
   making a plurality of sub-payments corresponding to the plurality of sub-charges if the further plurality of sub-charges are the same as the plurality of sub-charges.

7. The computer-implemented method for securing a transaction according to claim 1, wherein said method further comprises sending the password to an access facility.

8. The computer-implemented method according to claim 1, wherein the method further comprises:
   receiving a further password; and
   authenticating the completion of the transaction if the further password matches the determined password.

9. The computer-implemented method for securing a transaction according to claim 1, wherein the method comprises:
   storing the password;
   receiving a further password; and
   authenticating the completion of the electronic transaction if the further password matches the stored password.

10. The computer-implemented method of claim 9, wherein completion of the transaction comprises allowing access to the goods and/or services purchased by the transaction.

11. The computer-implemented method for securing a transaction according to claim 1, wherein the purchaser accesses the plurality of sub-charges through one or more existing secure network protocols and devices of the purchaser's financial institution, and wherein the transmitting the assembly key to the electronic address of the purchaser is via a non-secure channel.

12. A non-transitory, computer-readable medium, including computer-executable instructions stored thereon that, when executed by a processor of a control agent, causes the processor to:
   receive an original payment request associated with the transaction between the purchaser and the merchant and a predetermined amount of the transaction;
   split the predetermined amount associated with the transaction into a plurality of sub-charges associated with the transaction by using a random number generation function to randomize how the plurality of sub-charges are formed from the predetermined amount;
   generate an assembly sequence by: i) generating one or more sub-components by determining one or more string data values from one or more corresponding numerical data values of the sub-charges; and ii) processing, using an assembly key, the sub-components to form the assembly sequence as an ordered arrangement of a determined number of the one or more sub-components in accordance with an order of sub-component arrangement defined by the assembly key;

determine a one-time password using the generated assembly sequence;

receive identification information of a target device associated with goods and/or services purchased by the transaction;

transmit the one-time password to the target device over a network based on the identification information;

provide the plurality of sub-charges to a merchant, the merchant sending a plurality of sub-payment requests corresponding to the plurality of sub-charges to a purchaser's financial institution via a plurality of electronic messages associated with an original payment request;

transmit the assembly key to an electronic address of the purchaser of the transaction; and in response to the purchaser accessing the plurality of sub-charges via the purchaser's financial institution and generating the one-time password based on the assembly key and the plurality of sub-charges accessed via the purchaser's financial institution:

authenticate the purchaser as an authorized user of a financial instrument used to make the purchase of the transaction; and allow the purchaser access to the target device.

13. The non-transitory, computer-readable medium according to claim 12, wherein completion of the transaction comprises allowing access to the goods and/or services purchased by the transaction.

14. The non-transitory, computer-readable medium according to claim 12, wherein the purchaser accesses the plurality of sub-charges through one or more existing secure network protocols and devices of the purchaser's financial institution, and wherein the transmitting the assembly key to the electronic address of the purchaser is via a non-secure channel.

15. A computer system for securing a transaction between a purchaser and a merchant, the computer system comprising:

a processor of a control agent that comprises:

a sub-charge determination unit to:

receive an original payment request associated with the transaction between the purchaser and the merchant and a predetermined amount of the transaction;

split the predetermined amount associated with the transaction into a plurality of sub-charges associated with the transaction by using a random number generation function to randomize how the plurality of sub-charges are formed from the predetermined amount;

an assembly key unit to generate, based on an assembly key, an assembly sequence by: i) generating one or more sub-components by determining one or more string data values from one or more corresponding numerical data values of the sub-charges; and ii) processing, using an assembly key, the sub-components to form the assembly sequence as an ordered arrangement of a determined number of the one or more sub-components in accordance with an order of sub-component arrangement defined by the assembly key; and a password determination unit to determine a one-time password using the generated assembly sequence; and a communication port in communication with the processor, wherein the processor is adapted to:

receive identification information of a target device associated with goods and/or services purchased by the transaction;

transmit the one-time password to the target device over a network based on the identification information;

provide the plurality of sub-charges to the merchant, the merchant sending a plurality of sub-payment requests corresponding to the plurality of sub-charges to the purchaser's financial institution via a plurality of electronic messages associated with an original payment request;

transmit the assembly key via the communication port to an electronic address of a purchaser of the transaction; and in response to the purchaser accessing the plurality of sub-charges via the purchaser's financial institution and generating the one-time password based on the assembly key and the plurality of sub-charges accessed via the purchaser's financial institution the computer system:

authenticates the purchaser as an authorized user of a financial instrument used to make the purchase of the transaction; and allows the purchaser access to the target device.

16. The computer system for securing a transaction according to claim 15, wherein the processor is further adapted to send the password to an access facility via the communication port.

17. The computer system for securing a transaction according to claim 15, the computer system comprising:

a datastore to store the password;

a communication port to receive a further password; and a processor to authenticate the completion of the transaction if the further password matches the stored password.

18. The computer system for securing a transaction according to claim 15, wherein completion of the transaction comprises allowing access to the goods and/or services purchased by the transaction.

19. The computer system for securing a transaction according to claim 15, wherein the purchaser accesses the plurality of sub-charges through one or more existing secure network protocols and devices of the purchaser's financial institution, and wherein the transmitting the assembly key to the electronic address of the purchaser is via a non-secure channel.

* * * * *